Figure 6:
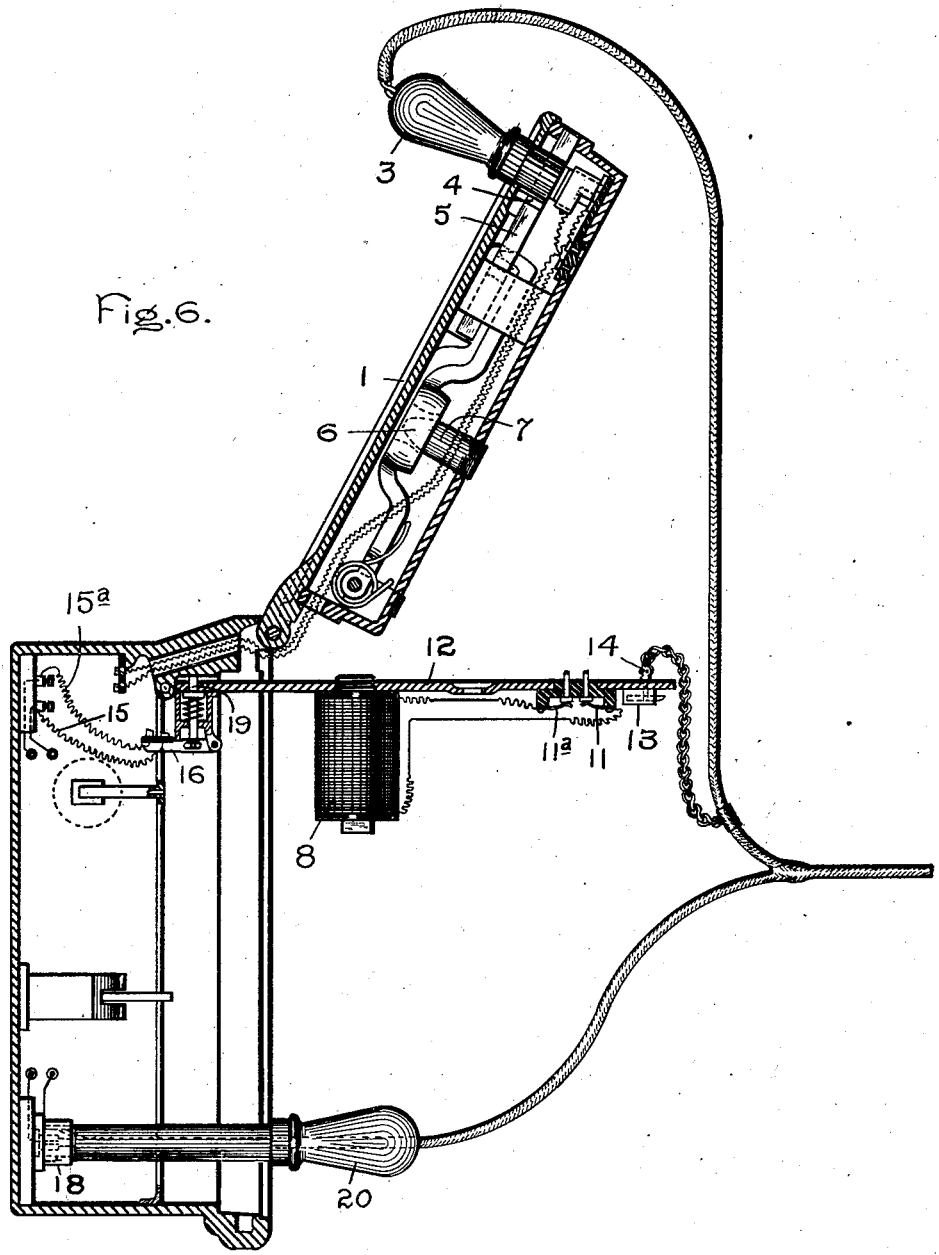

No. 726,548. PATENTED APR. 28, 1903.
H. LEMP.
CHARGING DEVICE FOR STORAGE BATTERIES.
APPLICATION FILED JULY 20, 1901.
NO MODEL. 4 SHEETS—SHEET 1.
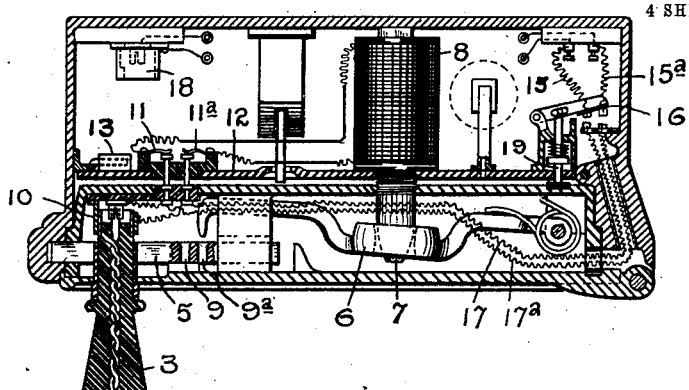
Fig. 1.
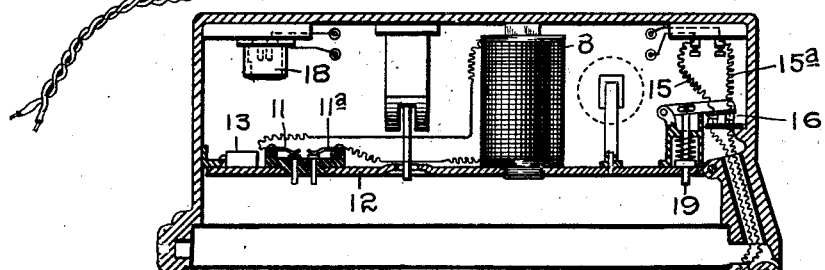
Fig. 2.
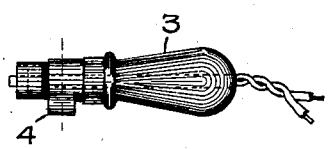
Fig. 3.
Fig. 4.
Fig. 5.
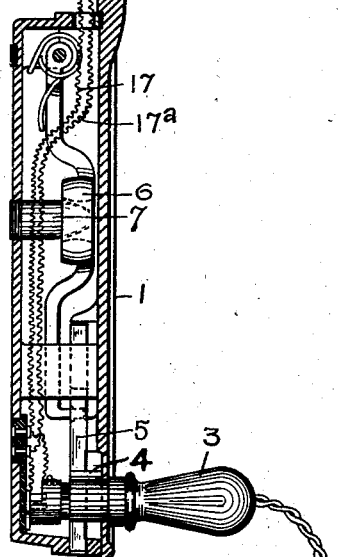
WITNESSES
Benjamin B. Hull,
Margaret E. Wooley.
INVENTOR
Hermann Lemp
By Albert G. Davis
Atty.

No. 726,548. PATENTED APR. 28, 1903.
H. LEMP.
CHARGING DEVICE FOR STORAGE BATTERIES.
APPLICATION FILED JULY 20, 1901.
NO MODEL. 4 SHEETS—SHEET 2.

WITNESSES.
Benjamin B. Hull,
Margaret E. Hooley

INVENTOR.
Hermann Lemp
By Albert G. Davis
Atty.

No. 726,548. PATENTED APR. 28, 1903.
H. LEMP.
CHARGING DEVICE FOR STORAGE BATTERIES.
APPLICATION FILED JULY 20, 1901.
NO MODEL. 4 SHEETS—SHEET 3.

WITNESSES.
Benjamin B. Hull
Margaret E. Hooley

INVENTOR
Hermann Lemp
By Albert G. Davis
Atty.

No. 726,548. PATENTED APR. 28, 1903.
H. LEMP.
CHARGING DEVICE FOR STORAGE BATTERIES.
APPLICATION FILED JULY 20, 1901.
NO MODEL. 4 SHEETS—SHEET 4.

WITNESSES
Benjamin B. Hull
Margaret E. Horlley

INVENTOR
Hermann Lemp
By Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

CHARGING DEVICE FOR STORAGE BATTERIES.

SPECIFICATION forming part of Letters Patent No. 726,548, dated April 28, 1903.

Application filed July 20, 1901. Serial No. 69,071. (No model.)

*To all whom it may concern:*

Be it known that I, HERMANN LEMP, a citizen of the United States, residing at Lynn, county of Essex, State of Massachusetts, have invented certain new and useful Improvements in Charging Devices for Storage Batteries, (Case No. 1,633,) of which the following is a specification.

To facilitate the charging of storage batteries mounted on electrically-propelled vehicles, it is desirable to provide along the public highways or at points convenient of access for such vehicles means for charging the storage batteries. Public stations of this kind for the supply of electric energy are known as "electrants." Several arrangements have been proposed for governing the electric connection between the service-mains of the supply system and the battery carried by the vehicle.

It is the object of my invention to provide a simple and effective means guarding against the unauthorized use or purloining of current and still permitting a cabman to obtain a supply of current by the deposit of a coin or token or by the use of an authorized key furnished by the supply company.

In carrying out my invention I provide a housing or cover for circuiting devices by which electrical connections may be established with a storage-battery vehicle normally sealed against access, so as to prevent the unauthorized delivery of energy, but adapted to be opened by a cabman carrying a special key or to be rendered accessible by the deposit of a coin or token.

My invention contemplates the delivery of current to two classes of vehicles. The first class embodies vehicles in which prepayment mechanism is installed within the vehicle, and my invention contemplates the supply to vehicles of this kind of a special key by which direct access may be gained to the electrant, the prepayment or coin-control mechanism being within a locked box on the vehicle itself. Such a kind of service is desirable, as it will permit a cabman to detach his plug at any time from the electrant irrespective of the amount of current he has taken, and at his leisure he may again effect the connection with another electrant until the full amount of the charge for which he has paid through the prepayment apparatus on his vehicle shall have been delivered. The other class of vehicles may gain access to prepayment devices in the electrant by use of a connecting-plug by means of which the outer door may be released, exposing the prepayment apparatus, after which by deposit of a coin connection may be automatically established. I provide a locked door which none but a cabman may open, in which are mounted insulated studs or contacts connecting with a release-magnet for a lock, which may be energized by the residual charge of the battery on a visiting vehicle, the magnet being wound so as to require approximately eighty volts to release the lock. In order to prevent the fraudulent use of current after the current has been rendered accessible, I provide devices insuring the locking of the door before a vehicle can leave the electrant, thereby preventing any but pay customers gaining access to the device. The amount of current delivered may be controlled in any suitable manner by means of a meter or other similar device, the key customers having a prepayment device mounted on their vehicles by which connection may be made with any number of plugs or electrants until the value of the deposited coin has been delivered in current, thus permitting them to take a limited supply and quickly disconnect their attachment from the electrant to answer the call of a fare, if necessary.

My invention therefore comprises a current-delivering apparatus for battery-operated vehicles provided with means normally rendering the current inaccessible, but adapted to be rendered so by the residual charge of the battery carried by the vehicle.

It comprises also a cover guarding the apparatus against tampering on the part of outsiders, but permitting access to cabmen and means for forcing the cabmen to restore the exposed parts to a protected condition before leaving the electrant.

It embodies also structural features which will be more particularly hereinafter described, and definitely indicated in the claims.

Figure 7:
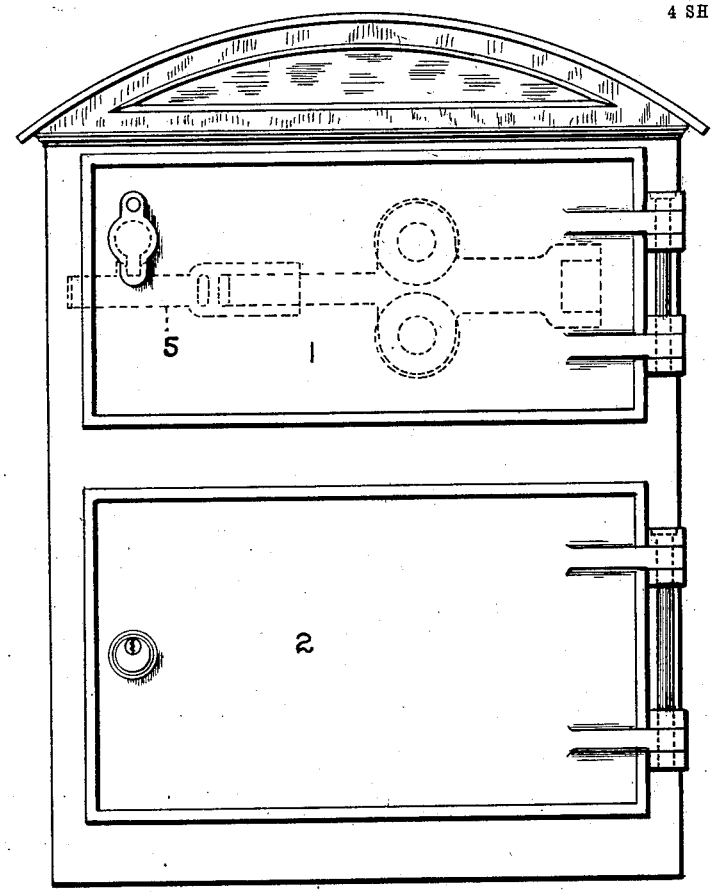
Figure 8:
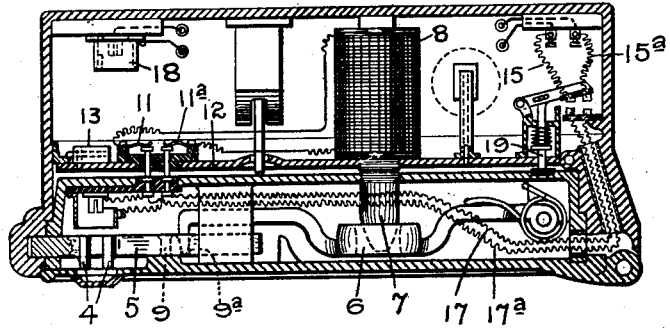
Figure 9:
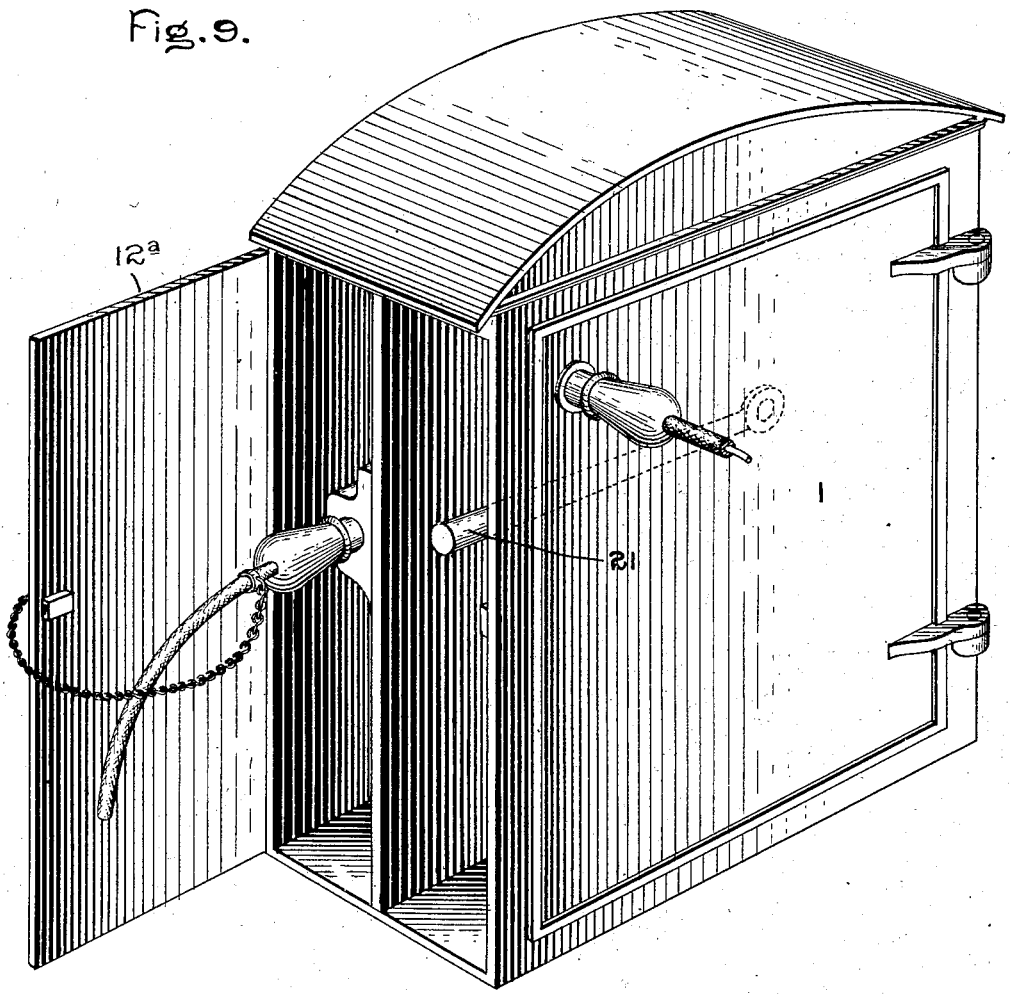

In the accompanying drawings, which illustrate my invention, Figure 1 is a sectional view of an electrant embodying my improvements, showing the door or cover which protects the apparatus closed and a cabman's plug connected. Fig. 2 is a similar view showing the door open. Figs. 3, 4, and 5 are detail views of the plug and lock controlled thereby. Fig. 6 is a sectional view showing both doors open as contemplated for cabmen provided with a key. Fig. 7 is a front view of an electrant embodying my improvements, showing both doors closed. Fig. 8 is a sectional view on the same plane as Fig. 1, the apparatus being in its normal condition; and Fig. 9 is a perspective view of a modified form of electrant.

The electrant comprises a substantial casing, which may be of cast-iron or other suitable material, into which are led mains or service-wires from the supply-circuit and which may comprise two inclosures, as seen in Fig. 7, guarded by separate doors 1 2, the upper of which gives access to the current, the lower of which may contain a wattmeter, a coin-box, and other attachments or apparatus not necessary to be kept within the upper inclosure. The lower door is sealed by a lock the key of which may be carried by an employee of the supply company. Both doors are normally locked. Each cabman has connected with his battery a flexible cable terminating in a plug 3, of insulating material, the tip of which is provided with contacts, as seen in Figs. 1 and 3, one being a centrally-insulated pin and the other a sleeve surrounding the pin on the tip of the plug. These two contacts are in electric connection with a twin cord or cable leading to the battery-terminals. The plug also carries an insulated metallic bit or web 4, adapted to enter the keyhole (indicated in dotted lines in Fig. 7) and to engage when inserted wards on a bolt 5, as will be understood from an inspection of Figs. 4 and 5. The bolt slides in guides on the inside of the door and is adapted to be locked in its open or closed position by a hook or detent on the end of an arm carried by an armature 6, coöperating with a pole-piece 7, carried by the door, but separable from its magnet 8. When the door is shut, the pole-piece is shifted into close relation or contact with the magnet-pole, so as to form, in effect, a prolongation or extension of the magnet-core. The armature-lever is spring-retracted, as indicated, and the hook on its end may engage either one of two holes or recesses 9 9$^a$, formed in the bolt. In the normal position of parts the bolt is locked by the engagement of the hook on the end of the armature-lever with the right-hand recess. When, however, the cabman inserts his plug in the door, the cable-terminals enter a socket 10 and effect electrical connection with the electromagnet 8. The terminals of the magnet connect with two spring-brushes 11 11$^a$, bearing on pins carried by the inner door 12. Coöperating pins are carried on the inside of the outer door, as shown in Fig. 1, and when the door is closed electric connection is completed between the contacts of the sockets 10 and the magnet-terminals. The magnet is wound for the voltage of the batteries, so that only the application of such voltage will release the outer door.

An additional safeguard is provided against tampering by requiring a special plug to gain access to the magnet-terminals. The inner door is guarded by a Yale lock 13, controlled by a key 14, (see Fig. 6,) which may be fastened by a chain to the cable of such cabmen as are provided with keys. Thus when a cabman inserts his plug 3 the magnet is energized, and the armature raised, thus freeing the bolt and permitting the cabman to turn it by means of his plug. The door being open, a coin may be deposited in a coin-orifice, by means of which a switch is thrown and the circuit closed through leads 15 15$^a$ and a switch 16, presently to be described, to wires 17 17$^a$, leading to the plug-socket.

The coin-control mechanism forms no part of my present invention, and I deem it unnecessary to describe it in detail, my invention being restricted to means for guarding the electrant against fraudulent access. The supply of current continues until suitable meter-controlled apparatus, which may be located in the lower part of the electrant, as hereinbefore referred to, interrupts the circuit. I provide means for forcing the cabman to close the door and leave the apparatus in its normal condition. When the door is swung open, the extension-pole 7 moves with the armature and the door away from the magnet 8 out of range of the magnetic field and the armature-spring retracts it, thereby forcing the detent on the end of its lever into the left notch in the bolt, as indicated in Fig. 2. The plug having been turned, this effectually locks it against withdrawal until the door is again securely closed, thereby again energizing the magnet, lifting the armature, and permitting the bolt to be turned, and after being turned so as to lock the door the plug may be withdrawn. By these means it is impossible for a cabman to withdraw his plug from the electrant while the door is open and to permit another cabman to take current without payment.

In order to accommodate the class of customers provided with keys, I provide the auxiliary door 12. Such customers will open the outer door in precisely the same manner as those not provided with keys and may then open the inner door, thus giving direct access to a socket 18, having direct connection with the supply-mains independent of the prepayment apparatus in the electrant. It becomes necessary for such a cabman to withdraw his plug to close the outer door, and it is obvious that in withdrawing his key from the inner door he must lock the latter; otherwise he cannot disengage his plug and move away from the electrant.

In order to prevent collusion between a key customer and another cabman, an auxiliary switch 16 is employed, which is mounted on a standard secured to the inner door near its pivot, as shown in Fig. 2, so that when that door is open the switch is open, thereby breaking connection between the wires 15 15ª and the wires 17 17ª, thereby disabling the plug-connections with the outer door, which is not needed so long as an auxiliary plug 20 is inserted in the socket 18. The key customers, as thus indicated, are provided with two plugs, one of which is employed to unlock the door and the other to draw current.

A spring-pin 19 is connected with the switch 16, by means of which when the outer door is closed the switch is opened and the circuit with the wires 17 17ª broken. Thus it will be seen that none but authorized parties can gain access to the current, and the cabmen are forced before they leave the electrant to leave the parts in safe condition.

In some cases I may dispense with the inner door herein described and employ two outside doors, as indicated in Fig. 9, the door 1 on the front being employed for the pay customers and the door 12ª on one side being employed for the key customers. Such a construction on account of its simplicity may be preferred in some cases. Thus a key customer may by the application of his key gain direct access to the supply-circuit. He need not interfere in any way with the door 1, using a Yale key on door 12ª, thus forcing him to withdraw his plug and lock the door before he can leave the electrant.

21 represents a rheostat-lever which may be used by both classes of customers to graduate the current. The means for gaining access through the door 1 may be the same as hereinbefore described. The plugs in this construction should be provided with different sockets to prevent collusion between a key customer and one of the other class.

Having thus described my invention, what I claim as new, and desire to secure by Letters Patent of the United States, is—

1. A charging-station for electrically-propelled vehicles provided with terminal contacts connected with an electromagnetic control device adapted for actuation by a residual battery charge in said vehicle.

2. A charging-station for electrically-propelled vehicles provided with a locked door barring access to the current-supply, and means responsive to a residual battery-current in said vehicle permitting release of the door.

3. A charging-station for electrically-propelled vehicles having prepayment devices controlling access to the supply-current, a door or cover over the same, contacts accessible to a cabman, adapted for the application of a source of electric potential and an electromagnetic device for the door controlled by said contacts.

4. A charging-station for electrically-propelled vehicles comprising a casing over the current-supply devices, a locked door for the same, and means enforcing the locking of the door before a cabman can withdraw his vehicle.

5. A charging-station for electrically-propelled vehicles comprising a casing over the current-supply apparatus, a locked door controlling access to said apparatus adapted to accommodate an unlocking device on the cabman's connecting-cable, and means for locking said devices against withdrawal until the door is again fastened.

6. A charging-station for electrically-propelled vehicles comprising a casing over the current-supply apparatus, a locked door controlling access to said apparatus adapted to accommodate an unlocking device on the cabman's connecting-cable, means for locking said device against withdrawal when the door is opened, and releasing means for the device actuated when the door is again fastened.

7. A charging-station for electrically-propelled vehicles comprising a casing over the current-supply apparatus, a magnetically-locked door controlling access to said apparatus, means controlled by the cabman's battery for releasing the magnetic lock, detaining devices for the cabman's connecting-cable, and means for permitting withdrawal of the cable when the door is locked.

8. A charging-station for electrically-propelled vehicles comprising a casing over the current-supply apparatus, a locked door controlling access to said apparatus, an electromagnet controlling the lock connection, means permitting energization of said magnet by the cabman's battery, and means for locking the cabman's cable and preventing its removal when the door is open.

9. A charging-station for electrically-propelled vehicles comprising current-supply apparatus, independently-accessible sets of supply-terminals, a guard therefor, connections for rendering them accessible to cabmen, and means for forcing the cabmen to restore the guards after use.

10. A charging-station for electrically-propelled vehicles comprising current-supply apparatus, a locked door guarding access thereto, an electromagnet responsive to a cabman's battery for releasing the lock, and means for removing the control of the magnet when the door is open.

11. A charging-station for electrically-propelled vehicles comprising current-supply apparatus, two locked doors each controlling supply of current to different classes of customers, and means for disabling the supply-terminals of the outer door when the inner one is open.

12. A charging-station for electrically-propelled vehicles containing prepayment apparatus for supplying current, and means for opening the supply-circuit within a casing when the vehicle is disconnected from the station.

In witness whereof I have hereunto set my hand this 18th day of July, 1901.

HERMANN LEMP.

Witnesses:
DUGALD McK. McKILLOP,
JOHN J. WALKER.